Feb. 11, 1936.  W. G. BAADE  2,030,043
DIRECTION SIGNAL FOR VEHICLES
Filed March 4, 1935  2 Sheets-Sheet 1
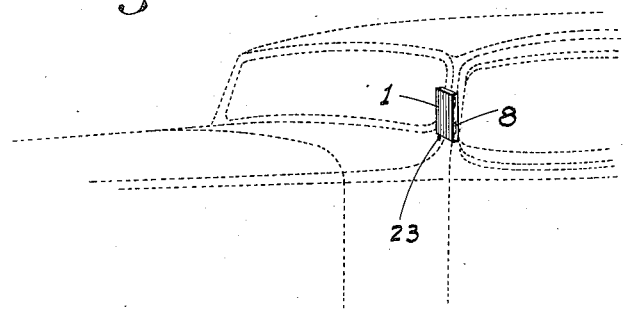
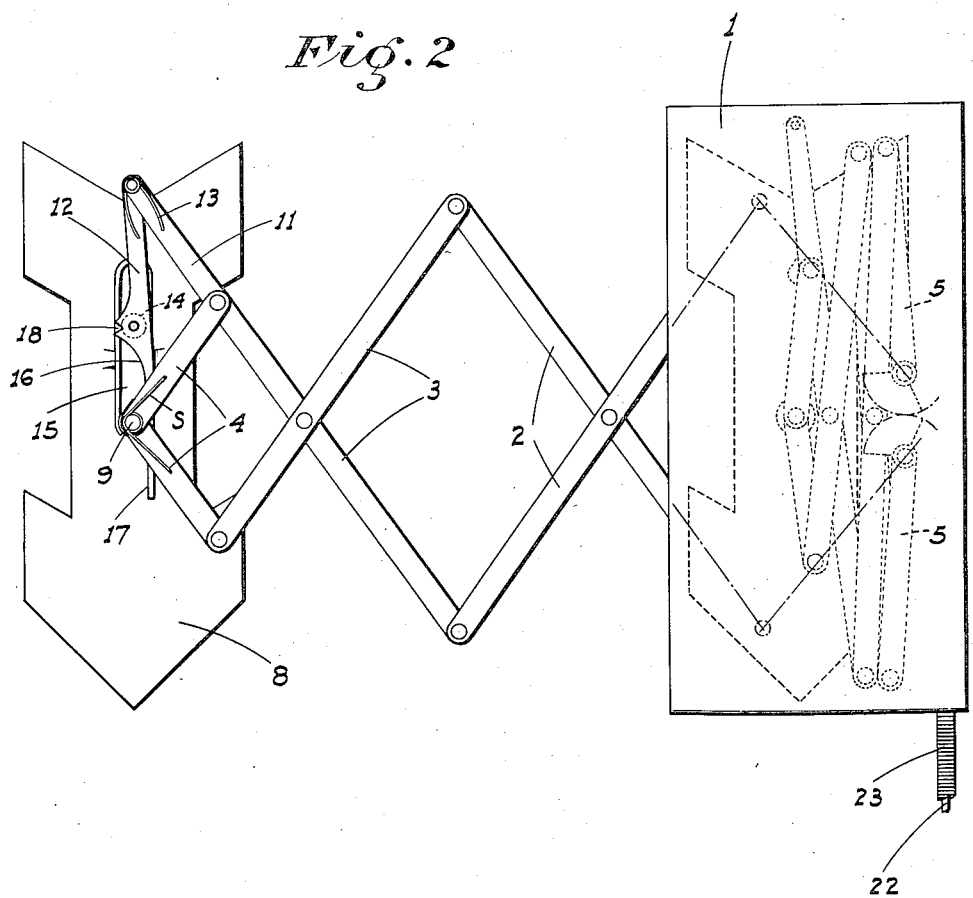
INVENTOR
*Wm. G. Baade*
BY
ATTORNEY Feb. 11, 1936.                    W. G. BAADE                       2,030,043
                          DIRECTION SIGNAL FOR VEHICLES
                       Filed March 4, 1935        2 Sheets-Sheet 2
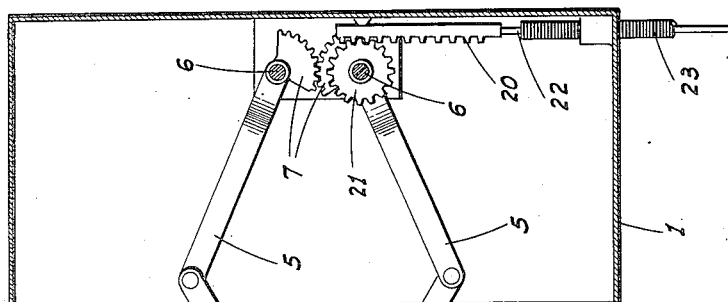
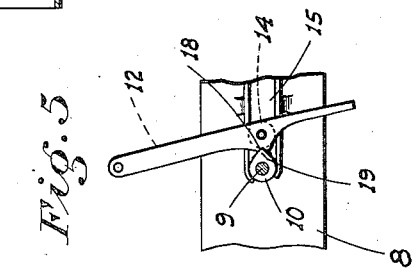
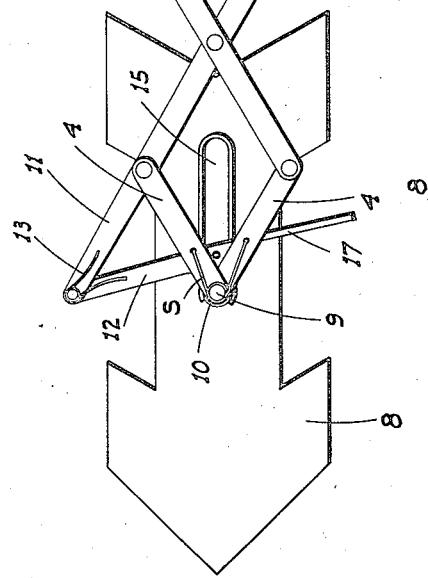
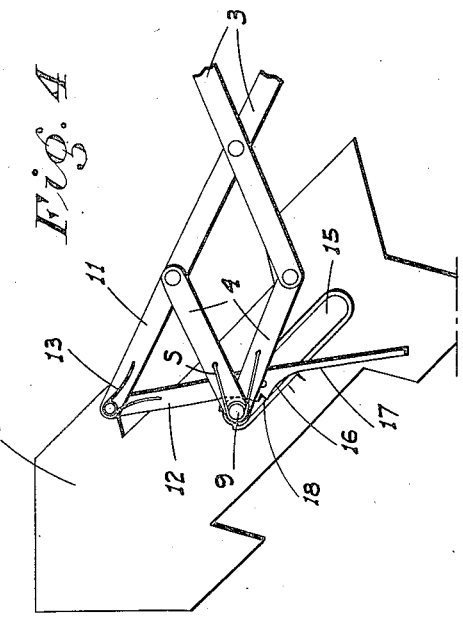
INVENTOR
Wm. G. Baade
BY
[signature]
ATTORNEY Patented Feb. 11, 1936

2,030,043

UNITED STATES PATENT OFFICE 2,030,043

DIRECTION SIGNAL FOR VEHICLES

William G. Baade, Woodland, Calif., assignor of one-third to C. C. McDonald and one-third to J. A. Murray, Woodland, Calif.

Application March 4, 1935, Serial No. 9,237

6 Claims. (Cl. 116—40)

This invention relates to mechanical direction signals for motor vehicles, my principal object being to provide a single device of this general character so constructed that while the signal member may be extended from one side of the vehicle a relatively great distance, so that it is readily visible from the rear regardless of the width of the vehicle, it occupies but little space on the vehicle when contracted and in its ultimate or inoperative position.

My signal device essentially comprises an extensible arm having a signal arrow movably mounted on the outer end of the same and normally, or when the signal is inoperative, disposed in a vertical position alongside the arm. Using the above general arrangement of parts, another object of my invention is to provide a means for causing the arrow to assume a horizontal position when the arm has been extended a certain distance, so as to indicate a left hand turn; and for causing said arrow to assume an upwardly angled position when the arm is extended slightly further, so as to indicate a right hand turn.

By means of this construction the arm and arrow when contracted or folded may occupy a minimum of space transversely of the vehicle, and the arm is extended practically the maximum distance for both right and left hand signals, as well as a stop signal, so that all signals are equally visible from the front and rear.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a fragmentary perspective outline of a motor vehicle looking toward the rear and showing my improved signal device mounted thereon and as it appears when the signal is contracted or inoperative.

Figure 2 is a side view of the device looking forward and with the arm only partly extended.

Figure 3 is a similar view showing the arm extended to give a left hand signal and with the signal housing in section.

Figure 4 is a fragmentary side view of the device showing the arrow moved to indicate a right hand turn.

Figure 5 is a fragmentary view of the arrow showing the position of the holding device between the arrow and its actuating member when the arrow is horizontally disposed.

Referring now more particularly to the characters of reference on the drawings, the device comprises a relatively narrow rectangular housing 1 open at its outer edge only and adapted to be mounted in an upright position by any suitable means on the left hand side of a motor vehicle adjacent the front body post so that the open edge of the housing faces outwardly.

The signal supporting arm comprises a lazy tongs arrangement which as usual consists of a number of pairs of crossing links pivoted together at their adjacent ends. In the present instance I provide one pair of links 2 pivoted together centrally of their ends, another pair of links 3 pivoted to the outer ends of the links 2 but pivoted to each other beyond their center of length so that the outermost portions of the links 3 are relatively short, and another pair of links 4 pivoted to the outer ends of the links 3 and the same length as said outermost portions of the links 3; said links 4 being pivoted to each other at their outer ends.

At their inner ends the links 2 are connected to link arms 5 disposed in converging relation toward each other and pivotally mounted in the housing 1 on transverse vertically separated shafts 6. Segmental spur gears 7 are fixed with the arms concentric with the shafts and constantly mesh with each other so that a swinging or turning movement applied to one arm or gear will swing the other arm a corresponding amount in the opposite direction.

The outer ends of the links 4 are pivoted together as stated and also to a flat signal arrow 8 centrally of the ends thereof by a common pin 9; a hub 10 rigid with the arrow surrounding the pin 9 between the arrow and links. The pin 9 of course is horizontal and extends lengthwise of the vehicle so that the arrow is disposed in a vertical plane.

The upper portion of that link 3 which projects beyond the pivotal connection of the upper link 4 therewith, is provided with a rigid extension 11, whose outer end is disposed substantially in a vertical plane with the pin 9. Pivoted on the upper end of the extension is a finger 12 which depends from said extension between the arrow and the links 4 behind the hub 9, being yieldably held in contact therewith by a suitable spring 13 connecting the extension and finger. Intermediate its ends the finger carries a pin or roller 14 which is disposed between the finger and arrow and rides in a guide slot 15. This slot is formed by an edge strip projecting from the adjacent face of the arrow and extends from the hub 10 lengthwise of the arrow toward the butt end of the same.

The hub engaging edge of the finger immediately below the pin 14 is formed as a concaved cam surface 16, sloping away from the hub and merging into a straight bottom portion 17 of said edge, as plainly shown. These parts are arranged and are of such size that when the links are completely folded or contracted and are substantially in a vertical position, they are entirely enclosed within the housing, as is the arrow. This positioning of the parts is shown in dotted lines in Figure 2. The arrow is then vertically disposed with its point down, the pin 14 is at the top of the slot 15, and the straight portion 17 of the finger 12 is engaged with the back side of the hub 10.

As the arms 5 swing out and toward each other with a turning movement applied to one of said arms, the links 2, 3 and 4 are of course also extended and relatively flattened out and the arrow is moved outwardly. At the same time the extension 11 is lowered moving the pin 14 along the groove toward the hub 10. The arrow remains straight however until just as the pin reaches the hub 10; the cam surface 16 engages the hub. This does not take place until the signal arm is nearly fully extended. With a slight further extension of the link-arm and the downward movement of the finger, the finger and consequently the pin 14 are swung to the rear. Since said pin is confined within the guide slot 15, the upper portion of the arrow is likewise swung down and rearwardly, so that the arrow is turned on its pivot pin 9 and is moved to a horizontal position with the point of the arrow facing outwardly. As soon as this position is reached a notch 18 on the finger engages a cam-point 19 on the adjacent face of the hub 10, as shown in Figure 5, yieldably holding the arrow in said horizontal position.

A further slight extension of the link-arm lowers the finger and pin still further, or so that the arrow will be swung to assume a substantially 45° upward angle, as shown in Figure 4, the movement of the arrow in this direction being limited by the engagement of the edge of the finger immediately above the pin and notch with the hub 10 as shown. This engagement of course also limits the extending of the arm. A suitable spring S between the links 4 tends to retract the arm, and takes up all slack.

The portions of the slot-strip adjacent the hub are springy and are disconnected from the arrow and hub, so as to yield away from the hub. These portions serve as cushions, to take up the shock of the pin 14 as the arrow is suddenly swung back to a vertical from a horizontal or angled position.

Stop signals may also be given if desired, by stopping the extension of the arm just before the arrow begins to swing toward a horizontal position.

The movement of the arms may be controlled by any suitable means operable from the driver's compartment within the vehicle. In the present instance such means is shown as being a vertical rack 20 disposed in the back of the housing and engaging a pinion 21 mounted on the lower shaft 6 in fixed connection with the adjacent gear 7. A flexible operating wire 22 is enclosed within a flexible housing 23 which extends from the bottom of the housing and through the sheathing of the vehicle body to a termination convenient to the operator. The particular arrangement in this respect is not shown as it is capable of considerable variation, depending on the particular type of vehicle, and besides is a form of remote control now very commonly used on motor vehicles.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A direction signal comprising a horizontally extensible arm in the form of a lazy tongs unit having crossing pairs of pivoted links pivoted together, a signal member disposed in a vertical plane and pivotally mounted on the outermost pair of links in common with the pivot thereof, an element about said pivot between the signal member and the adjacent links, an extension on one of the links of the pair adjacent said outermost pair projecting to a termination substantially in vertical alinement with said common pivot, a finger pivoted on said extension and projecting behind and normally engaging the element, a pin on said finger intermediate its ends, the signal member having a guide slot extending lengthwise thereof from the hub in the direction of the extension when the signal member is vertical and in which said pin moves and is guided, and an element engaging cam formed on the finger arranged to cause the pin to impart a rotative movement to the signal member when the pin arrives at the element end of the slot.

2. A structure as in claim 1, in which the cam edge of the finger is provided with a notch in radial alinement with the element, the latter being in the form of a hub rigid with the signal member and having a cam-point to engage in the notch when the signal member is horizontally disposed.

3. A structure as in claim 1, in which the cam edge of the finger immediately above the pin slopes away from the element a predetermined distance whereby to enable the signal member to be turned by downward movement of the pin beyond a horizontal position to an upwardly angled position.

4. A direction signal comprising a horizontally extensible arm in the form of a lazy tongs unit having crossing pairs of pivoted links pivoted together, a signal member disposed in a vertical plane and pivotally mounted on the outermost pair of links in common with the pivot thereof, a hub on the signal member about said pivot, an extension on one of the links of the pair adjacent said outermost pair projecting to a termination substantially in vertical alinement with and above said common pivot, a finger pivoted on and depending from said extension behind and normally engaging the hub, a pin on said finger intermediate its ends, the signal member having a guide slot extending lengthwise thereof from the hub in upstanding relation thereto when the signal member is vertical, the pin running in the slot, and a cam surface formed on the hub engaging edge of the finger immediately below the pin and arranged to cause the pin to be shifted in the direction of the inner end of the arm after said pin has reached the bottom of the slot whereby to cause said slot and the signal member to be turned to a horizontal position as the extension moves downwardly with the extension of the arm and the accompanying flattening of the links.

5. A direction signal comprising a horizontally extensible arm in the form of a lazy tongs unit having crossing pairs of links pivoted together, a signal member disposed in a vertical plane and pivotally mounted on the outermost pair of links in common with the pivot thereof, a hub on the member about said pivot, an extension on one of the links of the pair adjacent said outermost pair, a substantially vertical finger projecting behind and normally engaging said hub and pivoted on said extension whereby as the lazy tongs unit is extended the finger will move lengthwise relative to the hub, and means between the finger and the signal member to cause the latter after a predetermined amount of such relative movement of the finger to be swung about its pivot as an axis with a further movement of the finger and lazy tongs.

6. A direction signal comprising a horizontally extensible arm in the form of a lazy tongs unit having crossing pairs of links pivoted together, a signal member disposed in a vertical plane mounted on the outer end of the unit, means pivoting the inner ends of the innermost links of the unit in a fixed position and in spaced relation to each other, meshing gears connecting said pivoting means, another gear fixed with the pivot of one link, a rack bar engaging such gear, and a flexible push-and-pull element connected to one end of said rack bar.

WILLIAM G. BAADE.